DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 9, 1971

884 O.G. 433

T884,004

PROCESS FOR PROMOTING ADHESION BETWEEN POLYOLEFINS AND VARIOUS SUBSTRATES

Charles H. Coney, 2008 Canterbury Road, and John R. Gossett, Jr., 2116 Glen Burn Road, both of Kingsport, Tenn. 37660

Filed Apr. 20, 1970, Ser. No. 30,249
Int. Cl. C08g *17/08;* B32b *27/28*
U.S. Cl. 260—29.2
No Drawing. 19 Pages Specification

A method of promoting adhesion between the surfaces of substrates such as aluminum foil, cellophane, paper, polyester and the like and the surface of a polyolefin substrate such as polyethylene or polypropylene to which the first mentioned substrates do not normally adhere. This involves coating the substrate surface with a water-dispersible polyester primer dispersed in an aqueous medium followed by drying. The adhesion producing polyester primer is derived from monomer components which include dicarboxylic acid, hydroxycarboxylic acid, aminocarboxylic acid, aminoalcohol, glycol, diamine or combinations of such monomer components wherein at least a part of the total of all such monomer components is a poly(ethylene glycol), and at least a part of said total is one or more of said monomer components substituted with one or more sulfonate metal salt groups. The aqueous dispersion of the polyester primer may be applied to either the polyolefin surface or to the surface of the substrate to be adhesively joined thereto. The invention also involves the use of the polyester primer itself as an ingredient of printing inks to adapt such inks to be permanently printed on polyolefin sheet material such as that composed of polyethylene or polypropylene.